United States Patent
Pollman et al.

(10) Patent No.: US 7,578,362 B1
(45) Date of Patent: Aug. 25, 2009

(54) VEHICLES WITH DUAL PATH HYDROMECHANICAL TRANSMISSIONS

(75) Inventors: Frederic W. Pollman, Eden Prairie, IA (US); Michael A. Olinger, Ames, IA (US); Eric R. Jacobson, Ankeny, IA (US)

(73) Assignee: Sauer-Danfoss Inc., Ames, IA (US)

( * ) Notice: Subject to any disclaimer, the term of this patent is extended or adjusted under 35 U.S.C. 154(b) by 344 days.

(21) Appl. No.: 11/682,582

(22) Filed: Mar. 6, 2007

(51) Int. Cl.
*B62D 11/00* (2006.01)
*B60K 17/14* (2006.01)

(52) U.S. Cl. .................................. 180/6.48; 180/308
(58) Field of Classification Search ............... 180/6.48, 180/308; 417/269, 270, 271; 60/464, 487, 60/488
See application file for complete search history.

(56) References Cited

U.S. PATENT DOCUMENTS

| | | | |
|---|---|---|---|
| 3,151,456 A | 10/1964 | Swift | |
| 3,223,191 A | 12/1965 | Swift | |
| 3,354,977 A | 11/1967 | Swift | |
| 3,430,438 A | 3/1969 | Weiss | |
| 3,882,679 A * | 5/1975 | Williamson | 60/484 |
| 4,122,732 A | 10/1978 | Chana | |
| 4,393,952 A | 7/1983 | Schreiner | |
| 4,809,796 A * | 3/1989 | Yamaoka et al. | 180/6.48 |
| 4,962,825 A | 10/1990 | Albright et al. | |
| 4,997,412 A | 3/1991 | Reed | |
| 5,030,177 A | 7/1991 | Reed | |
| 5,139,465 A | 8/1992 | Sato | |
| 5,195,600 A | 3/1993 | Dorgan | |
| 5,390,751 A | 2/1995 | Puetz et al. | |
| 5,622,051 A * | 4/1997 | Iida et al. | 60/456 |
| 6,125,954 A | 10/2000 | Oota et al. | |
| 6,651,770 B2 * | 11/2003 | Abend et al. | 180/367 |
| 6,779,615 B2 * | 8/2004 | Boyer et al. | 180/6.48 |
| 6,932,733 B2 | 8/2005 | Pollman | |
| 6,935,454 B1 * | 8/2005 | Hauser et al. | 180/242 |
| 6,942,596 B2 | 9/2005 | Carlson et al. | |
| 6,966,859 B2 | 11/2005 | Pollman | |
| 7,036,615 B1 * | 5/2006 | Hauser | 180/6.48 |
| 7,264,068 B2 * | 9/2007 | Priepke | 180/6.24 |
| 2002/0179341 A1 * | 12/2002 | Boyer et al. | 180/6.48 |
| 2003/0205426 A1 * | 11/2003 | Lamela et al. | 180/305 |
| 2004/0026137 A1 * | 2/2004 | Hauser | 180/6.48 |
| 2007/0102223 A1 * | 5/2007 | Tate et al. | 180/305 |
| 2007/0107953 A1 * | 5/2007 | Abend et al. | 180/53.4 |

* cited by examiner

Primary Examiner—Lesley D Morris
Assistant Examiner—Marc A Scharich

(57) ABSTRACT

A vehicle having a frame with an engine mounted thereon. The engine has an output shaft that is connected to the input shaft of at least one hydromechanical transmission with a drive belt. A second hydromechanical transmission can then be used in association with the engine, first hydromechanical transmission and drive belt in order to provide an output to actuate driving elements in order to drive the vehicle.

14 Claims, 4 Drawing Sheets

VEHICLES WITH DUAL PATH HYDROMECHANICAL TRANSMISSIONS

BACKGROUND OF THE INVENTION

This invention relates to hydromechanical transmissions. More specifically, this invention relates to a hydromechanical transmission with a drive line arrangement that accommodates the need for increasing vehicle speeds.

There are a number of skid steer vehicles that require transmissions having the capability to provide a separate controlled speed output to each side of the vehicle in order to steer the vehicle. These include skid steer loaders, crawler tractors and loaders, tracked farm tractors, asphalt pavers and utility machines. These vehicles may have wheels or tracks, and if wheeled, may have either a fixed or variable wheel geometry. In order to steer many of these vehicles have a hydrostatic transmission for each side of the vehicle with a separate speed control for each transmission, typically referred to as a dual path transmission. These dual path transmissions are usually operated with a control input for each transmission in order to achieve both steering and forward or reverse motion control.

Transmission output drives for skid steer vehicles are typically located adjacent to the wheels or the tracks and are closely coupled to the wheel or track drive. This might include gears or chains depending on the vehicle needs. The engine may be positioned longitudinally with respect to the vehicle direction of travel, or transversely in order to accommodate space or weight distribution needs. The maximum output speed may vary according to the vehicle vocation. There are typically auxiliary hydraulic power requirements to supply work function implements. Prior drive line technology for skid steer vehicles includes dual path hydromechanical transmissions. These drive lines typically include portions of the two transmissions integrated in the same housing. Many of these prior art drive lines have drive shafts with angularly flexible connections (U-joints) at the input or output of the hydromechanical transmission. Many dual path hydromechanical transmissions have portions directly attached to the engine.

Hydromechanical transmissions are characterized by a hydrostatic transmission power path in parallel with a mechanical power transmission path, arranged in a manner to decrease the average power flow through the hydrostatic portion and thereby increase operating efficiency. Typically, the mechanical power path includes a planetary gear set which acts to sum the power flows at either the input or output end of the transmission.

The existence of parallel power paths create the possibility of reducing the output speed range or torque ratio in order to further reduce transmitted hydrostatic power. This then requires multiple ranges or "modes" to achieve the full torque and speed range of the transmission. The impact of multiple modes is to improve efficiency and sometimes to reduce cost. Multiple mode hydromechanical transmissions are usually accomplished by reusing the hydrostatic components and clutching to a different mechanical component. Usually the modes are arranged so that there is no ratio change during the mode change in order to have continuous speed or torque delivery.

There is a need in the art to provide greater output speeds in the forward, direction of travel to accommodate the desire to travel faster. Additionally, high efficiency of operation is also required in the art to minimize operating costs. Other needs in the art include providing a compact size of vehicle having transmissions that are easy to install and overall have a reduced cost. Specifically, the vehicles are work vehicles with high maneuverability requirements including counter rotation and spin turns. Many of the vehicles have the requirement for continuous forward and reverse cycling. Additionally desirable is to have a continuous ratio throughout the vehicle's speed range in order to allow maximum flexibility for the driver or the work to be done.

Thus, a principle object of the present invention is to provide a vehicle using a hydromechanical transmission that allows for increasing vehicle speeds.

Yet another object of the present invention is to provide a vehicle operating system that has increased efficiency with reduced operating cost.

Another object of the present invention is to provide an operating system for a vehicle that is compact in size.

These and other objects, features or advantages of the present invention will become apparent from the specification and claims.

BRIEF SUMMARY OF THE INVENTION

A vehicle having a frame with an engine having an output shaft associated therewith. The vehicle also has a first hydromechanical transmission having an input shaft that is connected to the output shaft of the engine with a drive belt. A second hydromechanical transmission having an input shaft that is associated with the engine such that the drive belt causes rotation of the input shaft of the first hydromechanical transmission and rotation of the input shaft of the second hydromechanical transmission in order to actuate driving elements of the vehicle.

DETAILED DESCRIPTION OF THE PREFERRED EMBODIMENT

Figure 1:
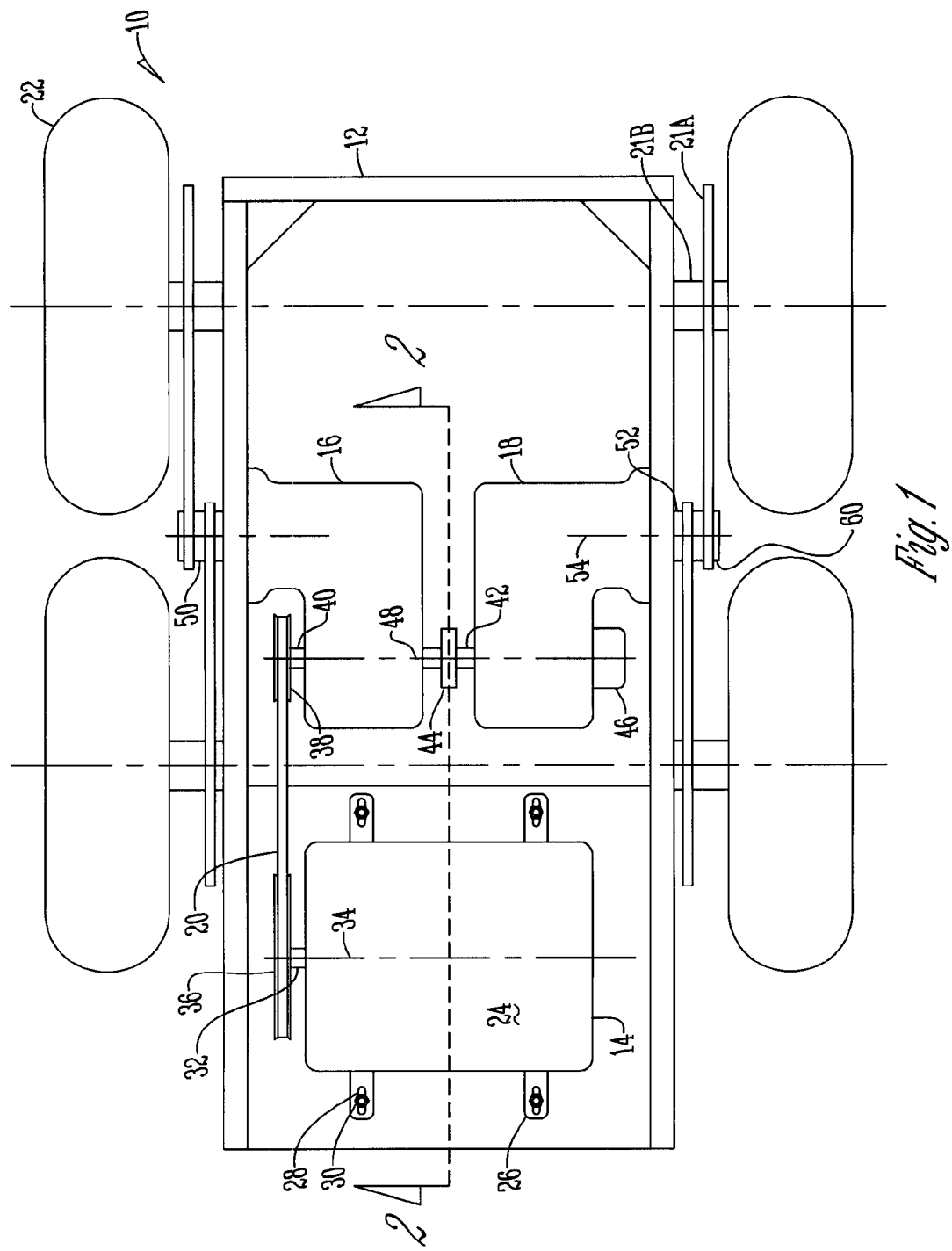
FIG. 1 is a top plan view of a vehicle with a dual path hydromechanical transmission.
Figure 2:
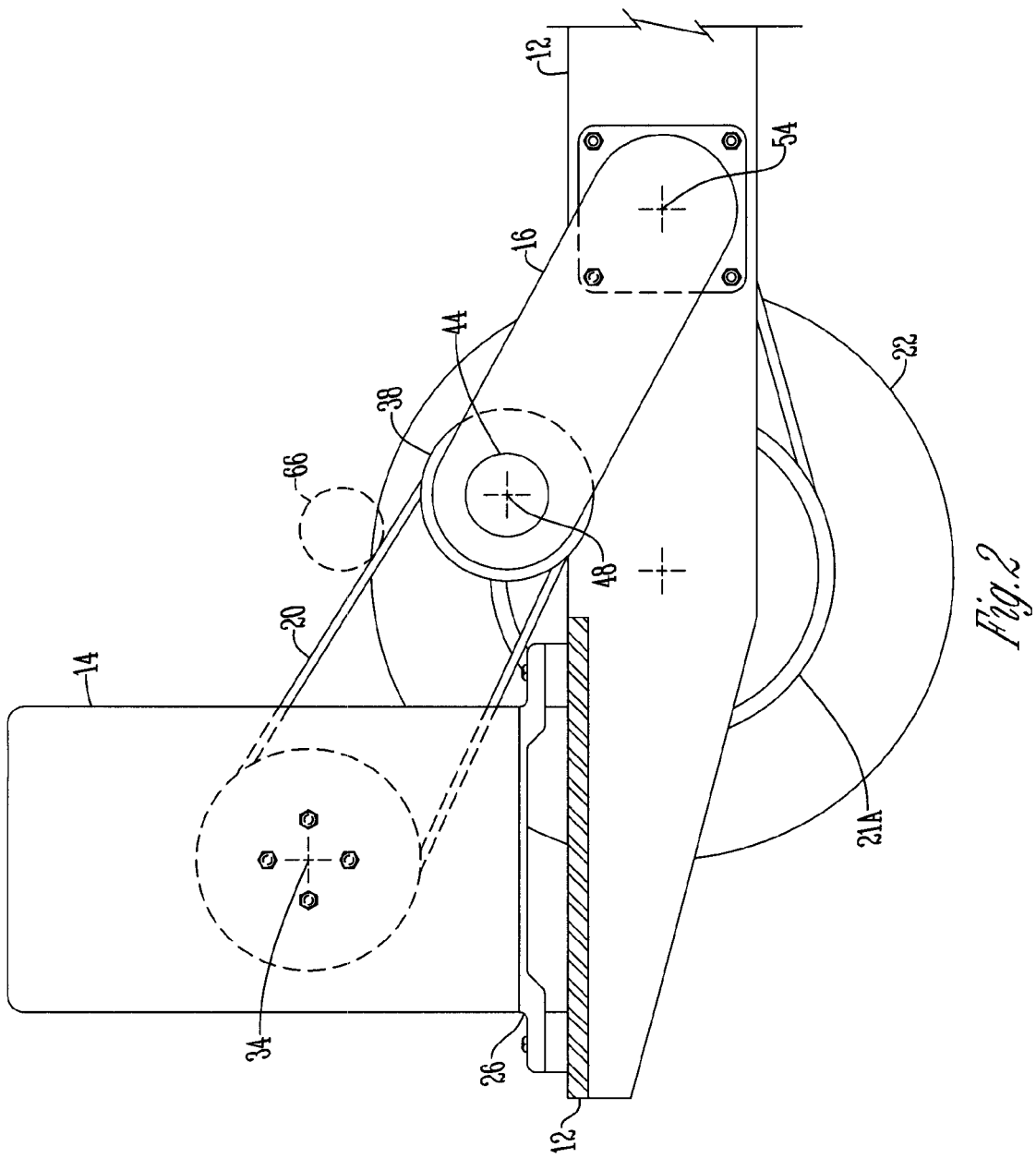
FIG. 2 is a sectional view of the vehicle taken along line 2-2 of FIG. 1.

FIGS. 1 and 2 show a first embodiment of a vehicle 10 that in a preferred embodiment is a skid steer vehicle. Vehicle 10 alternatively could be a crawler tractor and loader, tracked farm tractor, asphalt paver, utility machine or the like. The vehicle 10 has a frame 12 that accommodates and is associated with an engine 14 that drives first and second hydromechanical transmissions 16, 18 with a drive belt 20. Drive belt 20 is shown with a single strand but could be comprised of multiple strands. In one embodiment the hydromechanical transmissions 16 and 18 are connected to chains 21*a* that are connected to axles 21*b* to actuate driving elements 22.

First and second hydromechanical transmission 16, 18 in a preferred embodiment are hydromechanical transmissions that have at least two operating modes and have continuous ratio throughout the speed range. The number of modes and the exact scale of the torque and speed are a result of vehicle needs. Continuous power is delivered from the engine 14 to the driving elements 22, with continuous ratio change, from full reverse to full forward speed even though the transmission may change modes at zero speed and at a partial forward speed. Hydromechanical transmissions 16, 18 are individually controlled to regulate vehicle speed and direction. The transmissions 16, 18 are similar in configuration and have identical speed and tractive effort capability but have the outputs shafts on opposite sides.

Each pair of driving elements 22 on the same side of the vehicle 10 turn at the same speed. Some vehicles 10 may use a gear arrangement instead of chains 21*a* and axles 21*b* to drive the driving elements 22. The driving elements 22 may be wheels, tracks or the like.

The engine 14 comprises an engine housing 24 that is mounted onto the frame 12 with mounts 26 that have slots 28 therein such that a fastener 30 may be disposed through the slots 28 to secure the engine 14 to the frame 12. The mounts 26 and slots 28 allow horizontal movement of the engine 14 to provide tension to the drive belt 20. The engine 14 additionally has an output shaft 32 that is on a centerline 34 and is rotatably connected to a first pulley 36.

In the first embodiment as shown in FIGS. 1 and 2, the first and second hydromechanical transmissions 16, 18 are aligned such that the centerline 34 of the engine is transverse with the driving elements 22. In this embodiment the first hydromechanical transmission 16 is actuated by the drive belt 20 with a second pulley 38 that is rotatably connected to an input shaft 40 of the first hydromechanical transmission 16. The input shaft 40 extends through the first hydromechanical transmission and is coupled to the input shaft 42 of the second hydromechanical transmission 18 with an external coupling 44. As such the drive belt 20 translates rotational energy from the output shaft 32 of engine 14 via the first pulley 36 to the second pulley 38 to cause rotation of the input shafts 40, 42 of the hydromechanical transmissions 16, 18.

In this embodiment the input shaft 42 of the second hydromechanical transmission 18 extends through the second hydromechanical transmission 18 to act as a power take-off (PTO) shaft for an auxiliary device 46. The auxiliary device 46 in one embodiment may be an implement pump on the opposite side from the input. The input shaft 40 of the first hydromechanical transmission 16 and the input shaft 42 of the second hydromechanical transmission 18 lie upon an input centerline 48 and thus are aligned. The first hydromechanical transmission 16 also has an output shaft 50 whereas the second hydromechanical transmission 18 has an output shaft 52 wherein both of the outputs shafts 50, 52 are on an output centerline 54 that is in parallel spaced relation to the input centerline 48. Sprockets 60 may be placed on the output shafts 50, 52 respectively to actuate the driving elements 22 via the chains and axles 21*a* and 21*b* to cause forward motion of the vehicle 10.

Figure 3:
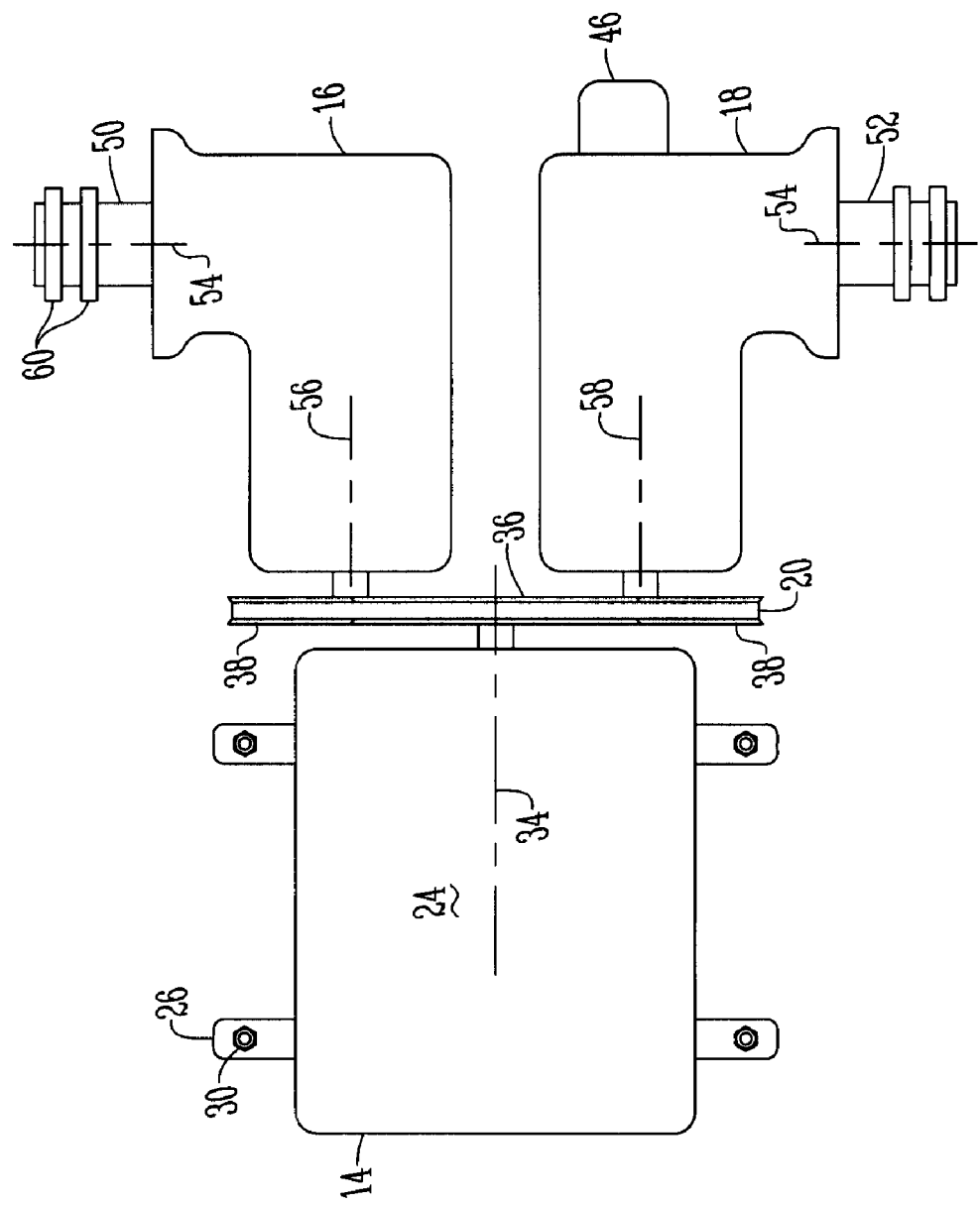
FIG. 3 is a top plan view of a dual path hydromechanical transmission.
Figure 4:
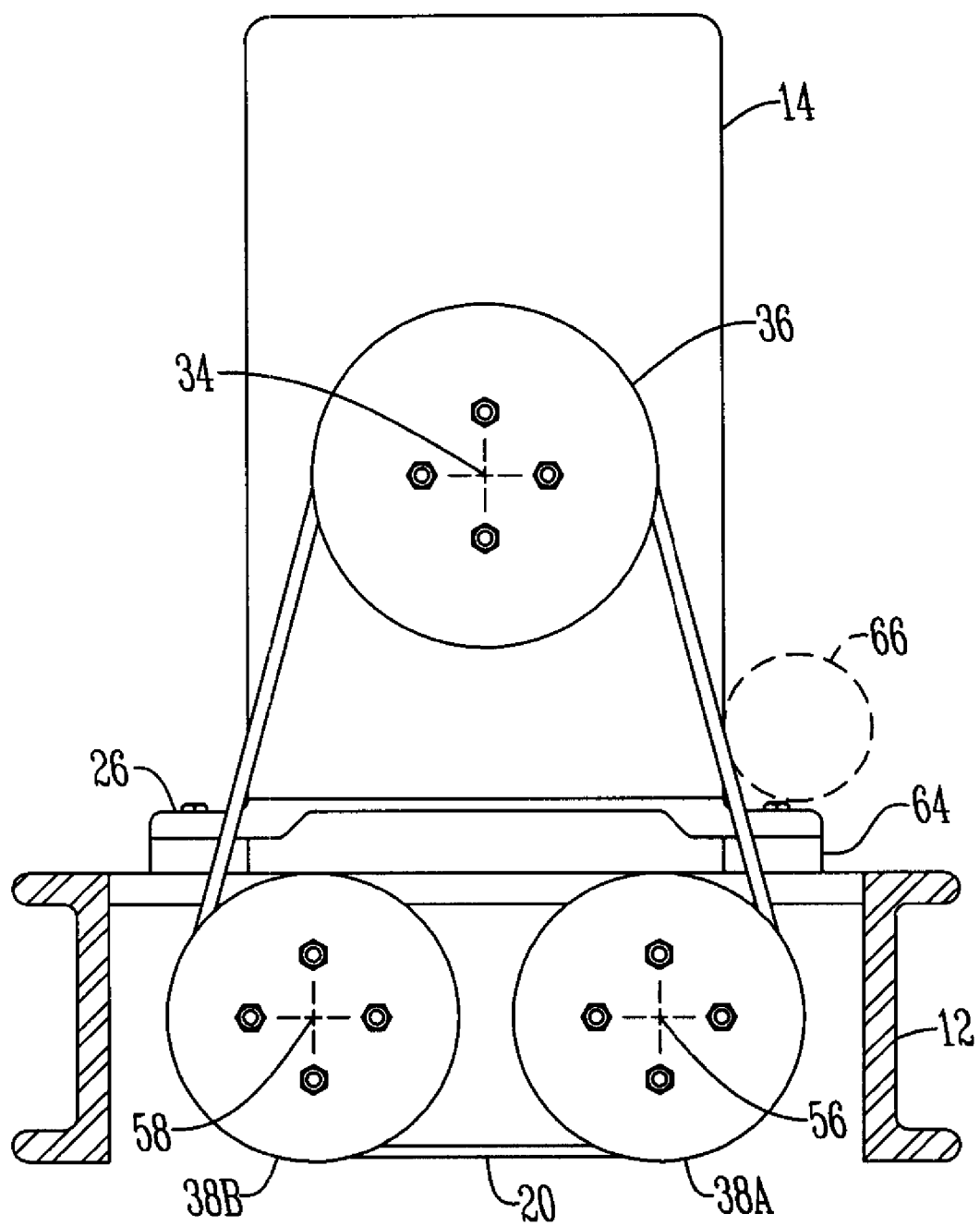
FIG. 4 is a plan end view of a dual path hydromechanical transmission.

In a second embodiment as best shown in FIGS. 3 and 4, the centerline 34 of the engine 14 is longitudinal to the driving elements 22. In this embodiment instead of a single pulley 38 that provides rotational energy for both of the input shafts 40, 42 of the first and second hydromechanical transmission 16, 18 two separate pulleys 38A, 38B are used. Specifically, pulley 38A is rotationally secured to the input shaft 40 of the first hydromechanical transmission 16 whereas the pulley 38B is rotatably secured to the input shaft 42 of the second hydromechanical transmission 18. Therefore, in this embodiment the input shaft 40 of the first hydromechanical transmission 16 is in parallel spaced relation with the input shaft 42 of the second hydromechanical transmission 18. Thus, the input shaft 40 of the first hydromechanical transmission 16 provides a first transmission input centerline 56 while in the input shaft 42 of the second hydromechanical transmission 18 provides a second transmission input centerline 58. As a result, the drive belt 20 translates rotational energy from the output shaft 32 of engine 14 via the first pulley 36 to the pulleys 38A, 38B to cause rotation of the input shafts 40, 42 of the hydromechanical transmissions 16, 18.

In this embodiment either input shaft 40, 42 may extend through either the first or second hydromechanical transmissions 16, 18 to an auxiliary device 46 to act as a power take-off shaft. As best seen in FIG. 3 the output centerline 54 remains the same as in the first embodiment and is transverse to the first and second input centerlines 56, 58 and engine centerline 34.

Additionally, in this embodiment a spacing element 64 may be used between the mount 26 and the frame 12 in order to provide vertical adjustment of the engine 14 to provide proper tension for drive belt 20. Alternatively, a belt tensioner 66 could be used in order to provide proper tension to the drive belt 20.

Thus, disclosed in an operating system for a vehicle 10 such as a skid steer vehicle which uses a pair of hydromechanical transmissions each having a separate housing, input and output. The hydromechanical configurations accommodate direct mounting to the vehicle frame at the outputs for close coupling to the wheels or tracks. The inputs are configured to have a single belt drive from the engine for both hydromechanical transmissions. Alternative hydromechanical transmission configurations accommodate transfers or longitudinal engine mounting. At least one of the hydromechanical transmissions has a power take-off for driving an auxiliary device such as an implement pump. Thus, at least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A vehicle comprising:
    a frame;
    an engine associated with the frame and having an output shaft;
    a first hydromechanical transmission having an input shaft connected to the output shaft of the engine with a drive belt; and
    a second hydromechanical transmission having an input shaft associated with the engine such that the drive belt causes rotation of the input shaft of the first hydromechanical transmission and rotation of the input shaft of the second hydromechanical transmission wherein the input shaft of the second hydromechanical transmission extends through the second hydromechanical transmission to provide a power through shaft that drives an auxiliary device.

2. The vehicle of claim 1 wherein the input shaft of the first hydromechanical transmission is coupled to the input shaft of the second hydromechanical transmission along an input centerline.

3. The vehicle of claim 1 wherein the input shaft of the first hydromechanical transmission is parallel to and spaced apart from the input shaft of the second hydromechanical transmission.

4. The vehicle of claim 1 wherein the first and second hydromechanical transmissions are individually controlled to actuate wheels of the vehicle.

5. The vehicle of claim 1 wherein the engine is mounted on the frame.

6. The vehicle of claim 5 wherein spacing elements are secured between the frame and the engine to adjust height of the engine.

7. The vehicle of claim 2 wherein the input shaft of the first hydromechanical transmission is coupled to the input shaft of the second hydromechanical transmission with an external coupling.

8. The vehicle of claim 3 wherein the first hydromechanical transmission has an output shaft at a right angle to the input shaft of the first hydromechanical transmission; and wherein the second hydromechanical transmission has an output shaft at a right angle to the input shaft of the second hydromechanical transmission.

9. The vehicle of claim 1 wherein the input shaft of the first hydromechanical transmission extends through the first hydromechanical transmission to provide a power through shaft that drives an auxiliary device.

10. The vehicle of claim 1 wherein the rotation of the input shaft of the first hydromechanical transmission and the input shaft of the second hydromechanical transmission actuates wheels of the vehicle.

11. The vehicle of claim 1 further comprising a belt tensioner mounted on the frame and rotatably connected to the drive belt.

12. The vehicle of claim 1 wherein the vehicle is a skid loader.

13. The vehicle of claim 1 wherein the engine is mounted transversely relative to wheels of the vehicle.

14. The vehicle of claim 1 wherein the engine is mounted longitudinally relative to wheels of the vehicle.

* * * * *